United States Patent
Merlin et al.

(10) Patent No.: US 6,399,171 B1
(45) Date of Patent: Jun. 4, 2002

(54) REACTIVE SILICONE/ALKYLENIMINE BARRIER LAMINATING ADHESIVES AND APPLICATIONS THEREOF

(75) Inventors: Patrick J. Merlin, Neufvilles; Daniel Futter, Brussels, both of (BE); John E. Wyman, Sanibel, FL (US); Imtiaz Rangwalla, Andover, MA (US); Gary Power, Melbourne (AU); Karen Branch, London (GB)

(73) Assignees: Dow Corning Corporation, Midland, MI (US); EG Technology Partners, L.P., Wilmington, MA (US); UCB Films PLC, Star House, Watford (GB)

( * ) Notice: Subject to any disclaimer, the term of this patent is extended or adjusted under 35 U.S.C. 154(b) by 0 days.

(21) Appl. No.: 09/341,252

(22) PCT Filed: Jan. 16, 1998

(86) PCT No.: PCT/BE98/00009

§ 371 (c)(1),
(2), (4) Date: Dec. 17, 1999

(87) PCT Pub. No.: WO98/31539

PCT Pub. Date: Jul. 23, 1998

(30) Foreign Application Priority Data

Jan. 17, 1997 (GB) .............................. 9700904

(51) Int. Cl.[7] .............................. B29D 22/00
(52) U.S. Cl. ................ 428/36.7; 156/273.7; 156/331.1; 156/331.8; 528/392
(58) Field of Search ............................ 156/331.1, 331.8, 156/273.7; 528/392, 332; 428/36.7; 525/451, 118, 3, 5

(56) References Cited

U.S. PATENT DOCUMENTS

| | | | | |
|---|---|---|---|---|
| 2,146,210 A | * | 2/1939 | Graves | 528/332 |
| 2,721,873 A | * | 10/1955 | MacKenzie et al. | 528/24 |
| 3,207,653 A | * | 9/1965 | De Lia et al. | 156/331.1 |
| 3,225,013 A | * | 12/1965 | Fram | 528/332 |
| 3,538,024 A | * | 11/1970 | Dishburger et al. | 528/392 |
| 3,655,633 A | * | 4/1972 | Saam | 528/26 |
| 3,728,215 A | * | 4/1973 | Espy | 525/451 |
| 4,483,891 A | * | 11/1984 | Cerny | 428/36.7 |
| 4,761,435 A | | 8/1988 | Murphy et al. | |
| 4,943,600 A | | 7/1990 | Noren et al. | |
| 5,213,648 A | | 5/1993 | Vermeulen et al. | |
| 5,215,822 A | | 6/1993 | Wyman et al. | |
| 5,354,829 A | | 10/1994 | Swisher et al. | |
| 5,449,552 A | * | 9/1995 | Bochow et al. | 428/36.7 |

FOREIGN PATENT DOCUMENTS

JP  7-18221  7/1993

* cited by examiner

*Primary Examiner*—John J. Gallagher
(74) *Attorney, Agent, or Firm*—Richard Gearhart; Alan Zombeck

(57) ABSTRACT

The invention relates to a method of laminating two substrates by coating at least one side of a substrate with a laminating adhesive, bringing a coated side of said substrate into contact with a second substrate to form a three layer film, and treating said three layer film with a free radical initiator, wherein said laminating adhesive is formed by mixing an ethylenically unsaturated acid and a polyamine.

20 Claims, No Drawings ated at 80% relative humidity.

REACTIVE SILICONE/ALKYLENIMINE BARRIER LAMINATING ADHESIVES AND APPLICATIONS THEREOF

FIELD OF THE INVENTION

The invention relates to polyamine containing coatings having both barrier and adhesive properties which are useful in packaging applications.

BACKGROUND OF THE INVENTION

It is well known that coatings containing silane compounds and itaconic acid improve the gas, oil, and flavor barrier performance of organic polymer film substrates. Moreover, the adhesion of the coating to the film surface, as well as the improved barrier characteristics provided by the silane coating, are greatly enhanced by exposing the coated film to electron beam radiation.

A particularly useful barrier composition is described in U.S. Pat. No. 5,215,822, which teaches a methanol solution of a vinyl benzyl amine silane (Dow Corning Z-6032), itaconic acid, and water; coating this solution on a corona treated low density polyethylene film, drying, and then subjecting the coated film to electron beam radiation grafts the coating to the film surface further improves the barrier properties of the silane coating. However, while this coating gives excellent gas barrier properties at low to moderate relative humidity values, the gas permeability increases drastically at very high relative humidity values.

The present inventors have surprisingly discovered that the combination of a polyamine and an ethylenically unsaturated acid gives excellent gas barrier properties at low to moderate relative humidity values, as well as excellent gas barrier properties at very high relative humidity values. The acid group and the amine form an amine salt which imparts excellent barrier properties to the composition. The composition may be crosslinked to further improve barrier.

None of the prior art teaches the present invention. For example, U.S. Pat. No. 4,761,435 claims UV curable polyethylenically unsaturated compositions in combination with a polyamine resin, which use an aryl ketone photosensitizer. The '435 patent teaches that acid functionality in the compositions is undesirable (col. 5, line 24). The patentees indicate that the formation of amine salts is to be avoided, because the photosensitizer reacts only with an amine, and not an amine salt. This is in contrast to the present invention, which teaches that the formation of acid salts is desirable and results in superior barrier properties.

Another example, U.S. Pat. No. 4,943,600, teaches the combination of a tertiary amine containing resin, allyl terminated resin, and a maleate functional resin. Likewise the patentee teaches that the compositions are formulated to minimize or eliminate carboxyl functionality, which contrasts directly with the present invention.

U.S. Pat. No. 5,017,406 claims UV curable compositions which contain reactive unsaturated compounds, but does not teach the use of a polyamine or an unsaturated acid as does the present invention.

JP (Kokai) publication 7-18221 published on Jan. 20, 1995 teaches a surface treatment composition for gas barrier comprising an aminosilane and a compound having an aromatic ring or hydrogenated ring. The present invention is distinguishable, however, because it does not require the addition of cyclic compounds having an aromatic ring, nor does the reference teach the addition of an ethylenically unsaturated acid.

The present invention is distinguishable from the prior art because none teach the addition of an ethylenically unsaturated acid to achieve gas barrier properties, nor do they teach a composition having both barrier and adhesive characteristics.

SUMMARY OF THE INVENTION

The present invention relates to a method of laminating two substrates by coating at least one side of a substrate with a laminating adhesive, bringing a coated side of said substrate into contact with a second substrate to form a three layer film, and treating said three layer film with a free radical initiator, wherein said laminating adhesive is formed by mixing an ethylenically unsaturated acid and a polyamine, wherein said polyamine optionally has a crosslinker reacted therein, and wherein said polyamine has four or more A, B, or C units, where:

A is an —$R^2$—$N(R^1)_2$ unit, B is an $R^1$—$N(R^2—)_2$ unit, and C is an (—$R^2)_3N$— unit, where:
  $R^1$ is independently selected from
    hydrogen, alkyl, substituted alkyl, aryl, substituted aryl, arylalkyl, and alkylaryl, and
  $R^2$ is independently selected from the group consisting of:
    linear or branched alkylene groups or substituted alkylene groups having from 1 to 18 carbon atoms, and arylene groups or substituted arylene groups having from 6 to 18 carbon atoms.

The invention can be used to laminate a variety of substrates for use in packaging applications. A composition according to the present invention may be employed to provide a barrier layer which improves resistance of the material to transmission of gases and aromas therethrough. For example, a 30 micron uncoated biaxially oriented, corona treated polypropylene film is generally found to have a permeability to oxygen of 1500 cc/$m^2$/day as measured at ASTM D3985-81 measured at 80% relative humidity. With the present coatings, the oxygen transmission rate of the same film can be reduced to less than 250 cc/$m^2$/day as measured at 80% relative humidity.

DESCRIPTION OF THE PREFERRED EMBODIMENTS

While the invention is susceptible of embodiment in many different forms there is described herein in detail preferred and alternate embodiments of the invention.

Polyamines

The polyamines of the present invention are polymeric, homopolymeric or copolymeric polyamines having four or more A, B, or C units, where:

A is an —$R^2$—$N(R^1)_2$ unit, B is an $R^1$—$N(R^2—)_2$ unit, and C is an (—$R^2)_3N$— unit, where:
  $R^1$ is independently selected from
    hydrogen, alkyl, substituted alkyl, aryl, substituted aryl, arylalkyl, and alkylaryl, and
  $R^2$ is independently selected from the group consisting of:
    linear or branched alkylene groups or substituted alkylene groups having from 1 to 18 carbon atoms, and arylene groups or substituted arylene groups having from 6 to 18 carbon atoms.

For example, $R^1$ or $R^2$ can be substituted with hydroxyl groups.

The amines of the present invention preferably have molecular weights of from about 150 to about 2,000,000, with about 400 to about 400,000 preferred, and most preferred being from about 600 to about 80,000. The high degree of polymerization of the amine provides a lower degree of tackiness in the final composition. The lower molecular weight polyamines can be further polymerized to form higher molecular weight polyamines by methods well known in the art, such as by reaction with dialkyl halides (i.e. ethylene dichloride), diisocyanates (e.g. tolydiisocyanate, hexamethylene diisocyanate), di(meth) acrylate esters (e.g. hexene diol diacrylate pentaerythritol diacrylate), diepoxides (ethylene glycol diglycidyl ether).

Examples of polyamines useful for the invention include polyvinyl amines, aminofunctional polyacryl amides, poly-DADMAC's polyvinyl pyrrolidene copolymers, polyethylenimine and the reaction product of ethylene diamine and epichlorohydic copolymers.

A preferred polyamine that can be used to achieve varying degrees of tackiness is the class of polyamines referred to as polyalkylenimines, such as polyethylenimine, which is readily available in a wide range of molecular weights and different degrees of branching. Polyethylenimines consist of a large family of water-soluble, i.e. hydrophilic, polyamines of varying molecular weight and degree of chemical modification. It is generally known that the polymerization of ethylenimine does not result in a polymer that is completely composed of units having a linear structure, but also a degree of branching depending on the acid concentration and the temperature during polymerization. This degree of branching may, for example, vary between 12 and 38 percent. The formula of polyethylenimine can be represented in the form of A, B, or C units, where A is an $-R^2-N(R^1)_2$ unit, B is an $R^1-N(R^2-)_2$ unit, and C is an $(-R^2)_3N-$ unit, where $R^1$ is hydrogen $R^2$ is an $-CH_2CH_2-$ group. The ratio of A to B to C units can be from about 1:0.5:0.5 to about 1:2:1, but is preferably from about 1:1:1 to about 1:2:1.

Additional groups may be grafted onto polyethylenimines using methods well known in the art, to change the affinity of the coating to the substrate, or the adhesive properties. Examples of polyethylenimine modification include reaction with ethylene oxide structures (ethylene oxide, glycidol) to introduce hydroxyl groups, reaction with cyanide and aldehydes followed by hydrolysis to introduce carboxylic acid groups ("Stricken Synthesis"), grafting of phosphoric acid or sulfonic acid groups, and grafting of lipophilic alkyl chains using alkalating agents such as dimethyl sulfate.

Preferred molecular weights of the polyethylenimine are from about 600 to about 80,000. Most preferred molecular weights of the polyethylenimine are from about 600 to about 25,000.

Typical polyethylenimines are SZ-6050, a silane grafted polyethylenimine available from Dow Corning Toray Silicone (Japan), and SP-103 and SP-110 which are 600 and 1000 molecular weight polyethylenimines available from Nippon Shokubai, (Japan).

Ethylenically Unsaturated Acid

A predetermined quantity of an ethylenically unsaturated acid is also added to the composition. By "ethylenically unsaturated acid" it is meant any acid which has vinyl unsaturation. The ethylenically unsaturated acid is likely to be added in the amount of up to about 80 parts by weight of the composition, with about 5 to about 75 parts by weight being most preferred. The most preferred ethylenically unsaturated acid for use in the present invention is itaconic acid; however, other acids such as fumaric, maleic, citraconic, acrylic, methacrylic, cinnamic, itaconic acid monomethylester, vinylphosphonic acid, sorbic acid, mesaconic acid, and vinyl sulphonic acid may be used as well.

The term "ethylenically unsaturated acid" as used herein is meant to include mixtures of one or more of the aforementioned acids. Preferably, the molar ratio of gram atoms of nitrogen in the polyamine to acid groups on the acid is from about 10:1 to about 1:100, with about 5:1 to about 1:10 being preferred and about 2:1 to about 1:4 being most preferred. In fact, the acid can be added to the solubility limit of the ethylenically unsaturated acid, which is typically reached in amounts of up to about 80 parts by weight of the composition.

Solvents

The components of the present invention can optionally be combined in the presence a solvent. In general, water, alcohols and blends thereof will serve as suitable solvents because the polyamine and the ethylenically unsaturated acid are soluble therein. Another highly preferred class of solvents are ether derivatives of mono or polyglycols, such as mono or polyalkylene oxides, which includes solvents like ethylene glycol dimethyl ether. In addition, the selected solvent will preferably wet the substrate. Preferably, the solvent should be non-toxic, and will not extend the drying time of the coating beyond what is commercially acceptable. The amount of solvent can range from about 20 to about 99 parts by weight and is preferably from about 60 to about 95 parts by weight of the composition. Preferred solvents are methanol, ethanol, n-propanol, isopropanol, butanol, and 1-methoxy-2-propanol (available as "Dowanol® PM" from The Dow Chemical Company, Midland, Mich.).

Optional Crosslinkers

While the polyamine and the ethylenically unsaturated acid may be combined to form the compositions of the present invention, it is highly preferred that a crosslinker is added to improve the barrier properties, reduce dewetting, and improve appearance. It is believed that a higher crosslink density results in these improved properties. As used herein the term "crosslinker" is define to mean an agent which can further chain extend and/or crosslink the polyamine. The crosslinker may be an organic crosslinker or more preferably, a reactive silane crosslinker, or mixtures thereof.

Organic Crosslinkers

While the polyamine and the ethylenically unsaturated acid may be combined alone to form the compositions of the present invention, it is preferred that a compound be added that will further chain extend and crosslink the polyamine chain. It is believed that a higher degree of polymerization and crosslinking of the polyamine is desirable to provide improved barrier properties and appearance of the barrier coatings of the present invention. The compounds useful to chain extend and crosslink the polyamine chain include, but are not limited to, multifunctional acrylates, methacrylates, epoxides, isocyanates, thiocyanates, acid halides, acid anhydrides, esters, alkyl halides, aldehydes or combinations thereof. Specific examples include, but are not limited to hexanediol diacrylate, glycidyl methacrylate, ethyleneglycoidiglycidyl ether, and tolyl diisocyanate.

The polyamine can be chain extended and crosslinked either prior to or subsequent to coating the composition on a substrate. Compounds useful to chain extend and crosslink the polyamine coating include those materials which will undergo an acid catalyzed condensation reaction with the nitrogen atom of the polyamine, such as tris-methylol phenol, aldehydes such as formaldehyde and glyoxal, p-benzoquinone, and mixtures of formaldehyde and active methylene compounds that will undergo a Mannich reaction.

The ethylenically unsaturated acid can be crosslinked independently of the polyamine by the addition of multifunctional compounds which will copolymerize with the ethylenically unsaturated acid. These compounds include multifunctional acrylates and methacrylates. In addition, the ethylenically unsaturated acid may be crosslinked directly into the crosslinked polyamine structure by the addition of acrylate and methacrylate functional silane. The acrylate and methacrylate functional silane compounds such as acryloxypropyltrimethoxy silane and methacryloxypropyltrimethoxy silane may be added to the compositions of this invention subsequent to the ethylenically unsaturated acid to crosslink the polyacid. Hydrolysis and condensation of the alkoxy or acyloxy groups subsequent to coating will form a polymeric material with multi functional groups which will copolymerize with the ethylenically unsaturated acid.

The organic crosslinkers are preferably added in a polyamine/organic crosslinker ratio of about 100:1 to about 1:10, with a preferred ratio being about 10:1 to about 1:1 and most preferred ratio being about 5:1 to about 2:1.

Reactive Silane Crosslinker

The most preferred compounds are those which contain both a functional group that will react with a nitrogen atom on the polyamine chain prior to addition of the ethylenically unsaturated acid to the compositions of this invention, as well as a trialkoxy or triacyloxy silane group which will undergo hydrolysis and condensation reaction subsequent to coating the composition of the present invention utilizing an optional solvent containing water.

Because the silane portion of the molecule is terminated with hydroxyl or alkoxy groups, it can condense with the alkoxy portion of other silicone terminated molecules to form Si—O—Si groups. The Si—O—Si bonds increase the crosslink density of the composition. The reactive silane can have the general formula $QSiR_m(OR)_{3-m}$, where Q is any group containing one or more acrylates, aldehydes, methacrylates, acrylamides, methacrylamides, isocyanates, isothiocyanates, anhydrides, epoxides, acid chlorides, linear or branched halogenated alkyl, and halogenated aryl, and m is 0, 1, or 2, and R is a group having from 1 to 4 carbon atoms. Specifically, the reactive silane includes molecules such as gamma-acryloxypropyl trimethoxysilane, gamma-methacryloxypropyl trimethoxysilane, 3-glycidoxypropyl trimethoxysilane, chloropropyl trimethoxysilane, chloropropyl triethoxysilane, gamma-isocyanatopropyltriethoxysilane, vinyltriethoxysilane, vinyltrimethoxysilane, vinyl-tris-(2-epoxy cyclohexyl) silane, ethyltrimethoxy silane, chloropropyl triethoxy silane, chloropropyl ethyldimethoxy silane, methyldimethoxy silane and glycidoxypropyl methyldimethoxy silane. The most preferred reactive silanes are chloropropyl trimethoxysilane available from the Dow Corning Corporation as Z-6076, chloropropyl triethoxysilane available from the Dow Corning Corporation as SZ-6376 and gamma trimethoxysilylpropyl glycidyl ether, available from the Dow Corning Corporation as Z-6040. It may be necessary to neutralize the polyamine after the reaction of the crosslinker therein, such as by adding sodium methoxide and filtering off the resulting precipitate.

The reactive silanes are preferably added in a polyamine/reactive silane weight ration of about 100:1 to about 1:10, with a preferred ratio being 10:1 to 1:1 and most preferred ratio being about 5:1 to about 2:1.

Coat Weight

The coating can be applied in any desired amount, however, it is preferred that the coating be applied in an amount such that the coat weight is up to about 20 gms/m$^2$, the most preferred coat weight being from about 0.5 to about 10 gms/m$^2$. Coat weight can be determined by gravimetric comparison. The coating can be applied to the substrate by any conventional method, such as spray coating, roll coating, slot coating, meniscus coating, immersion coating, and direct, offset, and reverse gravure coating.

Substrates

The coating can be disposed on a wide variety of substrates, including, but not limited to polyolefins, such as oriented polypropylene (OPP), cast polypropylene, polyethylene and polyethylene copolymers, polystyrene, polyesters, such as polyethylene terephthalate (PET), or polyethylene naphthalate (PEN), polyolefin copolymers, such as ethylene vinyl acetate, ethylene acrylic acid and ethylene vinyl alcohol (EVOH), polyvinylalcohol and copolymers thereof, polyamides, such as nylon, and MXD6, polyimides, polyacrylonitrile, polyvinylchloride, polyvinyl dichloride, polyvinylidene chloride, and polyacrylates, ionomers, polysaccharides, such as regenerated cellulose, and silicone, such as rubbers or sealants, other natural or synthetic rubbers, glassine or clay coated paper, paper board or Kraft paper, and metallized polymer films and vapor deposited metal oxide coated polymer films, such as $AlO_x$, $SiO_x$, or $TiO_x$.

The aforesaid substrates are likely to be in the form of a film or sheet, though this is not obligatory. The substrate may be copolymer, a laminate, a coextruded, a blend, a coating or a combination of any of the substrates listed above according to the compatibility of the materials with each other. In addition, the substrate may be in the form of a rigid container made from materials such as polyethylene, polypropylene, polystyrene, polyamides, PET, EVOH, or laminates containing such materials.

The aforesaid substrates may also be pretreated prior to coating by corona treatment, plasma treatment, acid treatments and flame treatments, all of which are known in the art.

In addition, the compositions of the present invention can be used as barrier layers on a wide variety of packaging containers, such as pouches, tubes, bottles, vials, bag-in-boxes, stand-up pouches, gable top cartons, thermo-formed trays, brick-packs, boxes, cigarette packs and the like.

Of course, the present invention is not limited to just packaging applications, and may be used in any application wherein gas, or aroma barrier properties are desired, such as tires, buoyancy sides, inflatable devices generally, etc.

Any of the foregoing substrates may have primers applied thereon. The primers are applied to the substrates by methods known in the art such as spray coating, roll coating, slot coating, meniscus coating, immersion coating, and direct, offset and reverse gravure coating. Suitable primers include, but are not limited to carbodiimide, polyethylenimine, and silanes, such as N-(2-aminoethyl)-3-aminopropyltrimethoxy silane and aminopropyltriethoxysilane.

The most preferred laminate structures are (where Co represents the coating composition of this invention), OPP/Co/OPP, OPP/Co/PE, metal oxide coated OPP/Co/OPP, metOPP/Co/PET, metal oxide coated PET/Co/PE, metal oxide coated OPP/Co/PE, metal oxide coated PET/Co/PP, metal oxide coated OPP/Co/PP, and PE/Co/PE.

Curing

The laminates are preferably cured by a free radical generator, such as ultraviolet, electron beam, or gamma radiation or chemical free radical generators such as azo compounds and peroxides. Low energy electron beam is the preferred method of curing because it is cheaper than gamma sources like Cobalt M-60. Its advantage over ultraviolet radiation as a cure system lies in its ability to generate free radicals without photoinitiators. It also imparts higher yields of crosslink density and chemical grafting of the coating to the substrate. Electron beam accelerators of various types such as van de Graaf-type, resonance transformer-type, linear-type, dynamatron-type and high frequency-type can be used as a source of electron beam. Electron beam having energy of from about 5 to about 2000 KeV, preferably from about 50 to about 300 KeV discharged therefrom may be irradiated in a dose of from about 0.1 to about 10 Mrads (Mr). A most preferred dosage is about 150 KeV of at least 5 Mr. Low electron beam voltages may be used if the substrate is treated in a vacuum. Commercially available sources of electron beam are Electrocure CB-150 available from Energy Sciences, Inc. (Wilmington, Mass).

The laminates may also be ultraviolet light cured if one or more photoinitiators is added prior to curing. There are no special restrictions on the photoinitiators as long as they can generate radicals by the absorption of optical energy. Ultraviolet light sensitive photoinitiators or blends of initiators used in the UV cure of the present composition include 2-hydroxy-2-methyl-1-phenyl-propan-1-one (Darocure® 1173), sold by EM Chemicals, and 2,2 Dimethoxy-2-phenylacetol-phenone (Irgacure® 651), sold by Ciba-Geigy Corporation, Hawthorne, N.Y. For purposes of this invention, it has been found that from 0.05 to about 5 weight percent based on the total solids in the composition, of the photoinitiators described therein will cause the composition to cure.

Other types of free radical generators, known to those skilled in the art may also be employed, such as promoted peroxides, azo compounds, etc.

In addition, other methods of curing may be required if a crosslinker is added to the composition. For example, if a reactive silane crosslinker is added, the composition may be cured via a condensation reaction, which requires the presence of moisture. The moisture may be present in the coating solution itself, or may be added through steam or in a high humidity oven. The reaction may be accelerated though the presence of heat, for example, by heating in an oven at temperatures up to about 140° C., with temperatures of from about 60° C. to about 120° C. being preferred and temperatures of about 90° C. to about 110° C. being most preferred. Heating time is temperature dependent and the coating will reach tack free time in one to 10 seconds. The heating step serves to evaporate the solvent, and accelerate the condensation reaction between silanol groups. The additional cure chemistries required will depend on the particular crosslinking systems employed, which are well known in the art.

The key factor in determining whether a particular formulation is acceptable as a laminate adhesive is whether the composition exhibits a minimum degree of tackiness. If the laminate adhesive is at least minimally tacky, then it will fall within the scope of the invention. The tackiness can be achieve by optimizing the ratios of the components as described above, or by adding a tackifier, such as a multifunctional acrylate.

Preferred Embodiment

In a preferred embodiment of the invention, a quantity of neutralized SZ-6050 is prepared by adding 8 parts of a solution of sodium methoxide (30% solids in methanol) to 100 parts of SZ-6050 (50% solids in isopropyl alcohol (IPA)). 3.68 parts of NaCl are produced by the neutralization and are eliminated by centrifuging the solution.

114.7 parts of itaconic acid are then added to 100 parts of the neutralized SZ-6050. The resulting solution is then diluted with 31.76 parts IPA and 37.26 parts water to obtain a 15% solids solution. A wetting agent, Triton® X-100 ("X-100") is then added in an amount comprising 0.1% by weight of the total composition.

The solution is then coated onto a corona treated 30 micron thick "Rayopp®" oriented polypropylene film from UCB Films and left 10 minutes to dry at room temperature. A laminate is then prepared by applying a second oriented polypropylene film on the coated one with a roller. The resulting laminate is then cured by electron-beam irradiation at 170 kV, 10 Mrads. Solutions are coated on the laminate to give a coat weight of 4–4.5 g/m$^2$.

Optional Additives

Various optional additives can be added to the composition to improve various properties as required. These additives may be added as desired and in any amount as long as they do not degrade the performance of the barrier coatings as illustrated herein. Such additives include antiblock and slip aides, such as stearamide, olemide or polar additives, such as epoxides, acrylates, methacrylates, polyols, glycidol, glycidyl methacrylate, ethylene glycol diglycidylether, bisphenol A diglycidylether, or polyamines, such as polyethylenimine and other silanes. Wetting agents, such as polyethoxylated phenol may also be added.

EXAMPLES

The oxygen permeability values for each film are given in units of cc/square meter per 24 hours, "dry" values measured at 0% relative humidity using a MOCON® Oxtran Model 100 and "wet" values at 80–82% relative humidity utilizing a MOCON® Model 2/20 MH. The MOCON® instruments were obtained from Modern Controls Corporation. For comparison, the polypropylene base film has a permeability of about 1500 cc/square meter/24 hours. In the examples cited below, the polyethylene imine was a 700 molecular weight polymer obtained from Aldrich Chemical Co. Itaconic acid (ICA) was also obtained from Aldrich Chemical Co. "Eccoterge EO-100" was obtained from Eastman Color and Chemical Co. The electron beam was produced by a Pilot Electrocurtain electron beam machine provided by Energy Sciences, Inc. The oriented polypropylene (OPP) film was obtained from UCB Films. The Z-6040, gamma-trimethoxysilylpropyl glycidyl ether, was obtained from Dow Corning Corporation, Midland, Mich. The SZ-6050 is a silane grafted polyethylenimine available from Dow Corning Toray Silicone Corp. (Japan), and was prepared by adding 40.5 parts of a 1000 molecular weight polyethylenimine (SP-110, available from Nippon Shokubai, Japan) to 49.3 parts isopropyl alcohol, then heated to 80–90 degrees C. Then 10.2 parts of chloropropyltrimethoxy silane were added and heated at 80–90 degrees C. for two hours. This solution was neutralized with NaMeO, then filtered.

The solutions were coated with a RK coater and left 10 minutes to dry at room temperature. Laminates were then prepared by applying a second film on the coated one with a roller. The resulting laminates were then cured by electron-beam at 170 kV, 10 Mrads or by UV (dose=11 mJ/cm$^2$). Solutions were coated with a green K-bar that gave a coat weight of 4–4.5 g/m$^2$ in the same conditions (30% solids in IPA). In Table 1 below, each the molar ratios of compositions and methods of preparation are shown.

Table 1

Preparation

SZ-6050/ITA (1:23) 11.47 g ITA were added to 10 g of a solution of neutralized SZ-6050 in isopropyl alcohol (IPA) (45% solids). The resulting solution was then diluted with 31.76 g IPA and 37.26 g water to obtain a 15% solids solution. In some cases, where indicated in Table 2, a wetting agent, Triton® X-100 ("X-100") was added after the dilution with water. The wetting agent was added in an amount comprising 0.1 percent by weight of the total composition. In another example, where indicated in Table 2, beta cyano ethyl acrylate (BCEA) was added as an additive in an amount comprising 10 percent by weight of the composition. The BCEA was added to the neutralized SZ-6050 prior to the addition of ITA.

SZ-6050/Z-6076/ITA (1:1:23) 10 g of Z-6076 were added to a 50 g solution of SZ-6050 (50% solids in IPA) to form a first solution. 11.7 g of itaconic acid were dissolved in 13.4 g of IPA and 18.9 g of water and added to 10 g of the first solution.

PEI(25000)/Z-6040/ITA (1:0.5:581) 0.04 g of Z-6040 were dissolved in 88.68 g of IPA. 7.77 g PEI were added. This solution was diluted with 88.68 g water, and then 23.49 g itaconic acid were then added.

PEI(700)/Z-6040/ITA (1:1:16) 2.36 g of Z-6040 were dissolved in 50 g of IPA and 50 g water. 7 g of 700 molecular weight polyethylene imine (PEI) were added to form a first solution. 20.8 g ITA was then dissolved in 35.4 g of IPA and 35.4 g water, then this solution was added to the first solution. A wetting agent, Triton® X-100 ("X-100") was added after the water. The wetting agent was added in an amount comprising 0.1 percent by weight of the total composition.

PEI/ITA (1:581) 7.77 g of PEI were dissolved in 86.68 g of IPA. This solution was diluted with 88.68 g water, and then 23.49 g itaconic acid was added.

SZ-6050/ITA (1:16) 5.32 g itaconic acid were added to 10 g of a solution of neutralized SZ-6050 (30% solids). This solution is diluted with 23.57 g water and 16.57 g IPA.

PEI(700)/GM/ITA (1:0.5:16) 0.175 g glycidyl methacrylate were dissolved in 20.18 g of IPA. 1.75 g PEI were added. This solution was diluted with 20.18 g water. 5.2 g itaconic acid were then added.

AM8/Z-6076/ITA (1:0.25:14) 8 g of Astramol AM8 (MW 762) were mixed with 2 g of Z-6076 in 10 g IPA, then left 24 hours under reflux at 90C. 1.36 g of sodium methoxide (solution 30% in methanol) was used to neutralize the 15 g of solution, which is then 45% solids in IPA/MeOH (1:0.08 wt:wt). 2.16 g of the solution was diluted with 7.98 g water and 6.95 g IPA. 1.85 g of ITA was added just before coating to make a final solution of 15% solids in IPA/Water/methanol. The coat weight was approximately 2.5 g.

AM8/Z-6076/ITA (1:0.75:14) 8 g of Astramol AM8 (MW 762) were mixed with 6 g of Z-6076 in 14 g IPA, then left 24 hours under reflux at 90C. 3.31 g of sodium methoxide (solution 30% in methanol) was used to neutralize the 17 g of solution, which is then 44% solids in IPA/MeOH (1:0.14 wt:wt). 2.11 g of the solution was diluted with 6.25 g water and 5.18 g IPA. 1.27 g of ITA was added just before coating to make a final solution of 15% solids in IPA/Water/methanol. The coat weight was approximately 2.5 g.

These solutions were formed into laminate structures of various configurations, as described below in Table 2. In Table 2, OPP is corona treated 30 micron thick "Rayopp®" oriented polypropylene film from UCB Films, metal oxide coated OPP is 30 micron metallized oriented polypropylene also available from UCB Films, PE is a 50 micron low density polyethylene film made by Dow Corning Corp. having a density of 0.92 and a 2 melt index. The OPET is 12 micron oriented polyethylene terephthalate, available as Ceramis® CTXD from Lawson Martin and the OPPSiOx is 20 micron oriented polypropylene coated with SiOx, available as Ceramis® CO, also from Lawson Martin.

TABLE 2

| Formulation | Substrate | OTR (cc/m$^2$) Cure | Dry OTR (cc/m$^2$ day) | Wet day | Obs. |
|---|---|---|---|---|---|
| NSZ-6050/ITA (1:23) + X-100* | OPP/OPP | EB | 10 | 8.33 | + |
| NSZ-6050/ITA (1:23) | OPP/OPP | UV | Not meas. | 7.8 | + |
| NSZ-6050/ITA (1:23) | OPP/metOPP | EB | 10 | 12 | + |
| NSZ-6050/ITA (1:23) + BCEA | OPP/OPET | EB | 0.65 | 0.81 | + |
| NSZ-6050/TTA (1:23) + X-100 | OPP/PE | EB | 88 | 8.2 | − |
| NSZ-6050/ITA (1.23) + X-100 | PE/PE | EB | 187 | 30 | + |
| NSZ-6050/ITA (1:23) | OPPSiOx/OPP | EB | <0.5 | 1.9 | + |
| NSZ-6050/ITA (1:23) | OPET Siox/PE | EB | <0.5 | <0.01 | + |
| NSZ-6050/Z-6076/ITA (1:1:23)** | OPP/OPP | EB | 33 | 1.14 | + |
| PEI (25000)/Z-6040/ITA (1:0.5:581) | OPP/OPP | EB | 3 | 0.73 | |
| PEI (700)/Z-6040/ITA (1:1:16) + X-100 | OPP/OPP | EB | 4.5 | 8.9 | + |
| PEI/ITA (1:581) | OPP/OPP | EB | 54 | 3.36 | + |
| PEI (700)/GM/ITA (1:0.5:16) | OPP/OPP | EB | 6 | 2.97 | + |
| SZ-6050/ITA (1:16) | OPP/OPP | EB | 2 | 26.1 | + |

*N is for neutralized.
**coated on a primed film (Z-6020 is 1% by weight in IPA/water (1:1)
"+" means excellent adhesion, "−" means poor adhesion.

What is claimed is:

1. A method of manufacturing a laminate having barrier properties comprising:
   (I) coating at least one side of a substrate with a laminating adhesive,
   (II) brining a coated side of said substrate into contact with a second substrate to form a multi-layer film, and
   (III) treating said multi-layer film with a free radical initiator, wherein said laminating adhesive is made by mixing an ethylenically unsaturated acid selected from the group consisting of itaconic, fumaric, maleic, citraconic, acrylic, methacrylic, and cinnamic, itaconic acid monomethylester, vinylphosphonic acid, mesaconic acid, sorbic acid, and vinyl sulphonic acid, and mixtures thereof and a polyalkylenimine having a crosslinker reacted therein, wherein said crosslinker is
   a) an organic crosslinker selected from acrylates, methacrylates, epoxides, isocyanates, thiocyanates, acid halides, acid anhydrides, esters, alkyl halides, aldehydes and combinations thereof, or
   b) a reactive silane having the formula $QSiR_m(OR)_{3-m}$, where Q is any group containing one or more acrylates, aldehydes, methacrylates, acrylamides, methacrylamindes, isocyanates, isothiocyanates, anhydrides, epoxides, acid chlorides, linear or branched halogenated alkyl, and halogenated aryl and m is 0, 1, or 2, and R is a group having from 1 to 4 carbon atoms, wherein said polyalkylenimine has four or more A, B, or C units, where:
   A is an —$R^2$—$N(R^1)_2$ unit, B is an —$R^1$—$N(R^2)_2$ unit, and C is an (—$R^2$)$_3$N— unit, where:
   $R^1$ is independently selected from hydrogen, alkyl, substituted alkyl, aryl, substituted aryl, arylalkyl, and alkylaryl, and
   $R^2$ is independently selected from the group consisting of: linear or branched alkylene groups or substituted alkylene groups having from 1 to 18 carbon atoms, and arylene groups or substituted arylene groups having from 6 to 18 carbon atoms, where the ratio of A to B to C units is from 1:0.5:0.5 to 1:2:1.

2. The method according to claim 1, wherein the molar ratio of nitrogen atoms on the polyalkylenimine to the acid groups on the ethylenically unsaturated acid is 10:1 to 1:100.

3. The method according to claim 1, wherein the laminating adhesive is dissolved in a solvent and the solvent is selected from the group consisting of water, alcohol, ether derivatives of mono and poly glycols, and mixtures thereof, and the solvent constitutes 60–95 parts by weight of the total mixture.

4. The method according to claim 1, wherein the free radical initiator of step (III) is provided by electron beam radiation, gamma radiation or ultraviolet radiation, optionally in the presence of photoinitiators.

5. The method according to claim 1, wherein the free radical initiator of step (III) is provided by heating said multi layer film in the presence of a free radical generator.

6. The method according to claim 4, wherein the electron beam treatment is performed at from 5 KeV to 2000 KeV and greater than 0.1 Mrads.

7. The method according to claim 6, wherein the electron beam treatment is performed at 150 kV and at least 5 Mrads.

8. The method according to claim 1, wherein the coated substrate of step (II) is heated.

9. The method according to claim 8, wherein the coated substrate of step (II) is heated in the presence of moisture.

10. The method according to claim 1, wherein the laminating adhesive includes an additive.

11. The method according to claim 10, wherein the additive is selected from the group consisting of antiblock and slip aides, polar additives, a silane, an acrylate or methacrylate, polyethylenimine, glycidyl methacrylate, glycidol, ethyleneglycol diglycidylether, bisphenol a diglycidylether and wetting agents.

12. The method according to claim 1, wherein the substrate of step (II) is treated with a primer.

13. The method according to claim 12, wherein the primer is selected from the group consisting of a silane, polyethylenimine, and carbodiimide.

14. The method according to claim 1, wherein the polyalkylenimine is polyethylenimine.

15. The method according to claim 14, wherein the polyethleneimine has a molecular weight of in the range of 600 to 25,000.

16. The method according to claim 1, wherein the substrate is selected from the group consisting of polyolefins, including oriented polypropylene (OPP), cast polypropylene, polyethylene and polyethylene copolymer, polystyrene; polyesters, including polyethylene terephthalate (PET), or polyethylene naphthalate (PEN); polyolefin copolymers, including ethylene vinyl acetate, ethylene acrylic acid and ethylene vinyl alcohol (EVOH), polyvinylalcohol and copolymers thereof; polyamides, including nylon, and MXD6; polyimides; polyacrylonitrile; polyvinylchloride; polyvinyl dichloride; polyvinylidene chloride; polyacrylates; ionomers; polysaccharides, including regenerated cellulose; silicone, including rubbers or sealants; natural or synthetic rubbers; glassine or clay coated paper; paper board; Kraft paper; and metallized films and vapor deposited metal oxide coated polymer films, including $AlO_x$, $SiO_x$, or $TiO_x$.

17. The method according to claim 1, wherein the second substrate used to form the laminate is selected from the group consisting of polyolefins, including oriented polypropylene (OPP), cast polypropylene, polyethylene and polyethylene copolymer; polystyrene; polyester, including polyethylene terephthalate (PET), or polyethylene naphthalate (PEN); polyolefin copolymers, including ethylene vinyl acetate, ethylene acrylic acid and ethylene vinyl alcohol (EVOH), polyvinylalcohol and copolymers thereof; polyamides, including nylon, and MXD6; polyimides; polyacrylonitrile; polyvinylchloride; polyvinyl dichloride; polyvinylidene chloride; polyacrylates; ionomers; polysaccharides, including regenerated cellulose; silicone, including rubbers or sealants; natural or synthetic rubbers; glassine or clay coated paper; paper board; Kraft paper; and metallized films and vapor deposited metal oxide coated polymer films, including $AlO_x$, $SiO_x$, or $TiO_x$.

18. The method according to claim 1, wherein the reactive silane is selected from the group consisting of: gamma-acryloxypropyl trimethoxysilane, gamma-methacryloxypropyl trimethoxysilane, 3-glycidoxypropyl trimethoxysilane, chloropropyl trimethoxysilane, chloropropyl triethoxysilane, gamma-isocyanatopropyltriethoxysilane, vinyltriethoxysilane, vinyltrimethoxysilane, vinyl-tris-(2-epoxy cyclohexyl) silane and ethyltrimethoxy silane, chloropropyl triethoxy silane, chloropropyl ethyldimethoxy silane, methyldimethoxy silane and glycidoxypropyl methyldimethoxy silane, and the mixture of step I has optionally been neutralized.

19. A packaging container comprising of multi-layer film integral therewith, wherein the multi-layer film is formed by a method according to claim 1.

20. The packaging container according to claim 19, wherein the package is selected from the group consisting of a pouch, tube, vial, bottle, bag-in-box, stand-up pouch, gable top carton, thermoformed tray, brick-pack, box and cigarette pack.

* * * * *